(12) United States Patent
Shmidov et al.

(10) Patent No.: US 12,118,107 B2
(45) Date of Patent: Oct. 15, 2024

(54) DETECTING SENSITIVE INFORMATION IN RECORDS USING CONTEXT AND DECOYS

(71) Applicant: INTUIT INC., Mountain View, CA (US)

(72) Inventors: Elad Shmidov, Kefar Sava (IL); Yerucham Berkowitz, Givat Shmuel (IL); Yair Horesh, Kfar-Saba (IL); Alexander Zhicharevich, Petah Tikva (IL)

(73) Assignee: INTUIT INC., Mountain View, CA (US)

( * ) Notice: Subject to any disclaimer, the term of this patent is extended or adjusted under 35 U.S.C. 154(b) by 679 days.

(21) Appl. No.: 17/332,054

(22) Filed: May 27, 2021

(65) Prior Publication Data

US 2022/0382891 A1 Dec. 1, 2022

(51) Int. Cl.
*G06F 16/245* (2019.01)
*G06F 21/62* (2013.01)
*G06N 5/04* (2023.01)
*G06N 20/00* (2019.01)

(52) U.S. Cl.
CPC ........ *G06F 21/6218* (2013.01); *G06F 16/245* (2019.01); *G06N 5/04* (2013.01); *G06N 20/00* (2019.01)

(58) Field of Classification Search
CPC ........ G06N 5/04; G06N 20/00; G06F 16/245; G06F 21/6218
USPC .......................................................... 726/26
See application file for complete search history.

(56) References Cited

U.S. PATENT DOCUMENTS

| 10,013,436 | B1* | 7/2018 | Cai ...................... G06F 16/5866 |
| 10,198,530 | B2* | 2/2019 | Hendrey .................. G06F 16/31 |
| 10,977,562 | B2* | 4/2021 | Duesterwald .......... G06N 20/00 |
| 2003/0152068 | A1* | 8/2003 | Balasaygun ........ H04L 65/1069 370/356 |
| 2015/0106380 | A1* | 4/2015 | Seo ...................... G06F 16/2246 707/741 |
| 2020/0410116 | A1* | 12/2020 | Williamson ........ G06F 21/6254 |
| 2021/0182607 | A1* | 6/2021 | Agarwal ................. G06F 18/24 |
| 2022/0036003 | A1* | 2/2022 | Bali ...................... G06F 40/205 |

FOREIGN PATENT DOCUMENTS

CN 112639845 * 4/2021 ............. G06F 18/24

* cited by examiner

*Primary Examiner* — Josnel Jeudy
(74) *Attorney, Agent, or Firm* — Patterson + Sheridan, LLP

(57) ABSTRACT

Aspects of the present disclosure provide techniques for detecting sensitive information. Embodiments include determining a first likelihood that a record contains at least a given type of sensitive information using a first detection technique that involves providing one or more inputs to a machine learning model based on the record and receiving the first likelihood as an output from the machine learning model based on the one or more inputs. Embodiments include determining a second likelihood that the record contains at least the given type of sensitive information using a second detection technique comprising a search of the record. Embodiments include applying a policy to determine whether the record contains sensitive information based on the first likelihood and the second likelihood. Embodiments include performing one or more actions based on whether the record contains sensitive information.

15 Claims, 8 Drawing Sheets

DETECTING SENSITIVE INFORMATION IN RECORDS USING CONTEXT AND DECOYS

INTRODUCTION

Aspects of the present disclosure relate to techniques for detecting sensitive information in records using context information and decoys.

BACKGROUND

Every year millions of people, businesses, and organizations around the world utilize software applications to assist with countless aspects of life. In many cases, sensitive information may be processed by software applications in order to provide various functions, such as management of health information, finances, schedules, employment records, and the like. Sensitive information, such as personally identifiable information (PII), is protected by various laws and regulations, and must generally be protected from unauthorized access by software purveyors.

One manner in which sensitive information may be left vulnerable to unauthorized access is the inadvertent storage of sensitive information in records, such as log files, produced by software applications. For instance, a software application may generate log records of various events occurring during execution of the application, and these events may involve the processing of sensitive information. As such, it is important to determine if log records contain sensitive information so that the sensitive information can be removed or encrypted and/or so that code producing the log records can be modified to prevent future generation of log records containing sensitive information.

Therefore, what is needed is a solution for improved detection of sensitive information in records.

BRIEF SUMMARY

Certain embodiments provide a method for detecting sensitive information. The method generally includes: determining a first likelihood that a record contains at least a given type of sensitive information using a first detection technique comprising: providing one or more inputs to a machine learning model based on the record; and receiving the first likelihood as an output from the machine learning model based on the one or more inputs; determining a second likelihood that the record contains at least the given type of sensitive information using a second detection technique comprising a search of the record; applying a policy to determine whether the record contains sensitive information based on the first likelihood and the second likelihood; and performing one or more actions based on whether the record contains sensitive information.

Other embodiments provide a method for training a sensitive information prediction machine learning model. The method generally includes: receiving a plurality of records associated with ground truth labels indicating whether each of the plurality of records contains sensitive information; generating a training data set by: removing standard prefixes from the plurality of records; and replacing, in the plurality of records, each entity corresponding to a given structure with a generic representation of the given structure; and training a machine learning model based on the training data set to output a likelihood of a given record containing sensitive information in response to inputs related to the given record.

Other embodiments provide a system comprising one or more processors and a non-transitory computer-readable medium comprising instructions that, when executed by the one or more processors, cause the system to perform a method. The method generally includes: determining a first likelihood that a record contains at least a given type of sensitive information using a first detection technique comprising: providing one or more inputs to a machine learning model based on the record; and receiving the first likelihood as an output from the machine learning model based on the one or more inputs; determining a second likelihood that the record contains at least the given type of sensitive information using a second detection technique comprising a search of the record; applying a policy to determine whether the record contains sensitive information based on the first likelihood and the second likelihood; and performing one or more actions based on whether the record contains sensitive information.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
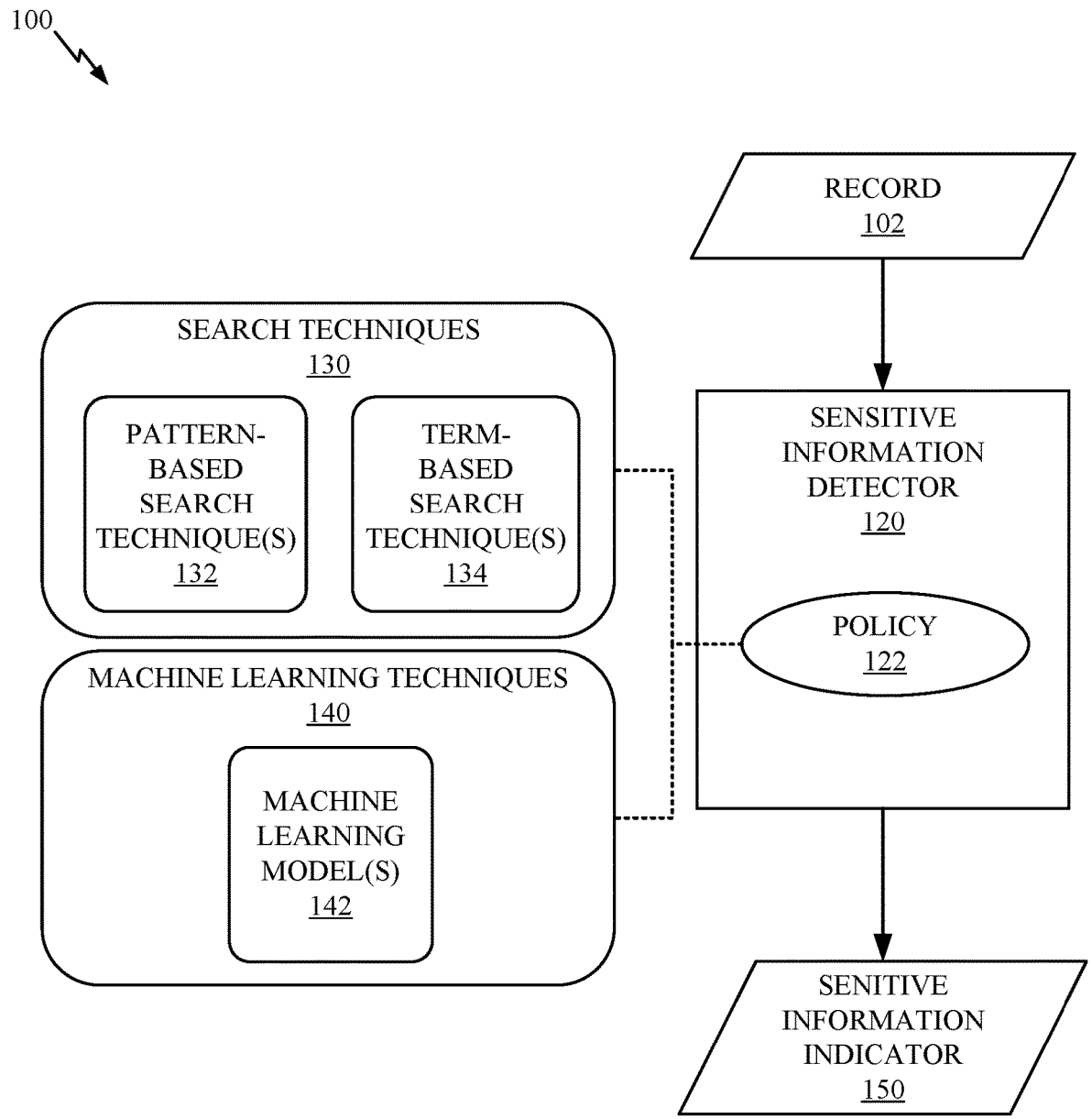
FIG. 1 depicts an example of detecting sensitive information in records.

Aspects of the present disclosure provide apparatuses, methods, processing systems, and computer-readable mediums for detecting sensitive information in records, such as log records generated by various software applications.

Conventional techniques for detecting sensitive information in files generally rely on searching for regular expressions. A regular expression, or RegEx, is a pattern used to match character combinations in strings of text. However, regular expressions tend to be rigid, and therefore often miss sensitive information that does not conform exactly to the patterns specified in the regular expressions. In particular, regular expression-based techniques for detecting sensitive information tend to have poor performance in log records due to the unstructured and non-standard nature of log records.

To overcome the technical shortcomings of conventional pattern-matching techniques, embodiments described herein use combined (or hybrid) search techniques and machine learning techniques to determine whether records, such as log records, contain sensitive information, such as personally identifiable information (PII). Beneficially, rather than relying only on a single detection technique, embodiments described herein leverage a plurality of parallel detection techniques intermediated based on a policy defining preferences and parameters related to the detection techniques.

As described in more detail below with FIG. 1, a policy may indicate that one or more search techniques and/or one or more machine learning techniques are to be used for detecting sensitive information in a record. In one example, a policy states that a machine learning technique is to be employed first and, if the machine learning technique results in an initial determination that the record is likely to contain sensitive information (e.g., a likelihood above a threshold), then a search technique is to be employed (e.g., to reduce false positives by confirming the determination of the machine learning technique). Furthermore, the policy may state that if the search technique results in a determination that the record is likely to contain sensitive information (e.g., a likelihood above a threshold), then a final determination is made that the record contains sensitive information. Thus, the present disclosure describes multiple detection techniques controlled by a policy that may be used individually or in combination to detect sensitive information in records.

Example search techniques are described in more detail below with respect to FIGS. 2 and 3, and may involve searching for particular sets of search terms in proximity to one another in records, such as log records. In one example, lists of common first names and last names are used to generate sets of search terms for detecting names in records. A first set of search terms may include common first names meeting one or more conditions (e.g., being longer than a certain number of characters and excluding certain exceptional names, such as names that also have secondary meanings that are not sensitive). A second set of search terms may include common last names that meet the one or more conditions.

Excluding exceptional names from the search terms may beneficially reduce false positives (e.g., a determination that a record includes sensitive information when it does not). For example, while "Chase" is a first name, it is also the name of a bank. Thus, if "Chase" appears in a record, it may refer to a bank instead of a person's name, or vice versa. Similarly, excluding names of less than a threshold number of characters may also reduce false positives by avoiding trivial appearances of these shorter names. For example, while "Tim" is a first name, this three character sequence may appear in a record for a variety of reasons unrelated to a person's name, such as within the word "time".

If one of the first names in the first set of search terms is detected in a record, then a search may be performed to determine if one of the last names in the second set of search terms is within a certain proximity (e.g., a given number of characters) of the detected first name in the record. If one of the last names is detected near the detected first name, then the record may be considered likely to include a person's name. In some embodiments, a score is determined based on how many pairs of first and last names are detected in a record, the score indicating a likelihood that the record contains sensitive information. Similar techniques may be utilized for other types of sensitive information, such as dates of birth.

Machine learning techniques are described in more detail below with respect to FIG. 4. Machine learning models are generally trained using historical data. Given a set of training data, a machine learning model may generate and refine a function that determines a target attribute value based on one or more input features.

For example, if a set of input features describes a record and the target value is whether the record contains sensitive information, a machine learning model can be trained to predict whether a record contains sensitive information based on the input features, such as the characters in the record or "tokens" determined based on the text of the record. Tokens may, for example, refer to separate groups of characters, such as individual words and numbers that are separated by spaces and/or other delimiters in a record.

The predictive accuracy a machine learning model achieves ultimately depends on many factors. Ideally, training data for the machine learning model should be representative of the population for which predictions are desired (e.g., unbiased and correctly labeled). In addition, training data should include a substantive number of training instances relative to the number of features on which predictions are based and relative to the range of possible values for each feature.

In one embodiment, a first set of records known to contain sensitive information and/or a second set of records known to not contain sensitive information are used to train a machine learning model to predict whether a given record contains sensitive information. The sets of records may be preprocessed prior to model training, such as by removing common prefixes (e.g., prefixes commonly used in log records) and/or replacing common structures (e.g., network addresses) with generic representations. Model training is described in more detail below with respect to FIG. 4.

In some embodiments, the machine learning model outputs a confidence score indicating a likelihood that a given record contains sensitive information based on features of the given record. In some embodiments separate models are trained for different types of sensitive information. For example, a first model may output a likelihood that a given record contains a name and a second model may output a likelihood that the given record contains a date of birth.

A policy for detecting sensitive information based on one or more detection techniques (e.g., search techniques and/or machine learning techniques) may be dynamically updated over time, as described in more detail below with respect to FIG. 5. For example, after using the policy to determine whether a plurality of records contain sensitive information, ground truth labels may be received from a user indicating whether each of the plurality of records actually contains sensitive information. These ground truth labels may be used to revise the policy, such as by favoring detection techniques and/or parameters (e.g., thresholds, ranges, input features, order of performing detection techniques, number of detection techniques used, number of detection techniques that must produce a confidence score above a threshold, and/or the like) that produce results that more closely match the ground truth labels.

If a record is determined to include sensitive information generally (or one or more particular types of sensitive information) based on a policy, then various actions can be taken to address the issue. For example, sensitive information may be removed from the record or encrypted within the record. In another example, a notification may be generated indicating that the record contains sensitive information. In some cases, code that resulted in the generation of the record may be modified so that it no longer includes sensitive information in records.

Certain embodiments of the present disclosure may favor reduction of false positives over a high detection rate in order to efficiently identify and address the sources of sensitive information being written to records. For instance, because a single section of code is generally responsible for generating many records, it is only necessary to identify a single record produced by the section of code that includes sensitive information in order to determine that the section of code should be modified to stop writing sensitive information into records. Thus, in addition to using a policy to confirm the presence of sensitive information through a plurality of detection techniques, stricter conditions may be employed, such as searching only for names longer than a given number of characters or searching only for dates in a limited range most likely to be dates of birth (e.g., dates in the 1970s, which are unlikely to appear in records for any reason other than indicating dates of birth).

Embodiments of the present disclosure improve upon existing techniques for detecting sensitive information in a variety of ways. For example, unlike techniques that rely only on rigid regular expressions, embodiments described herein involve dynamic detection of sensitive information based on multiple detection techniques, thereby accounting for the dynamic and unstructured nature of electronic records such as log files. The use of multiple detection techniques may further mitigate challenges associated with applying machine learning techniques to new data for which a model has not yet been trained, particularly by supplementing machine learning techniques with search techniques. Utilizing machine learning techniques, embodiments described learn context associated with sensitive information in records in order to predict the presence of sensitive information in a given record even if an item of sensitive information is not explicitly detected (e.g., based on features other than the sensitive information itself). Furthermore, in addition to the use of machine learning techniques and policies involving multiple detection techniques, by utilizing search techniques based on specific sets of search terms having a high likelihood of corresponding to sensitive information and excluding search terms that may not necessarily correspond to sensitive information, embodiments of the present disclosure reduce false positives.

Techniques described herein further improve sensitive information detection by allowing policies to be dynamically modified over time based on ground truth labels, such as by favoring detection techniques and parameters that result in determinations more closely matching the ground truth labels. For example, if a first search technique is consistently more accurate than a second search technique based on ground truth labels, a policy may be modified to favor the first search technique rather than the second search technique. By allowing sensitive information to be identified with a high degree of accuracy, techniques described herein allow root causes of sensitive information disclosure to be identified and addressed, such as by modifying code responsible for generating records to prevent the inclusion of sensitive information in the records.

Example Policy for Detecting Sensitive Information

FIG. 1 is an illustration 100 of an example related to detecting sensitive information in records. Illustration 100 includes a sensitive information detector 120, which generally represents one or more components (e.g., implemented on one or more computing devices, as described in more detail below with respect to FIG. 8) that perform operations related to applying a policy 122 for detecting sensitive information.

Policy 122 indicates a process by which sensitive information detector 120 is to determine whether a record (e.g., record 102) contains sensitive information. In some embodiments, policy 122 is specified by a user or is automatically generated. As described in more detail below with respect to FIG. 5, policy 122 may be dynamically modified over time (e.g., automatically or manually) for improved results based on ground truth labels. Policy 122 indicates one or more search techniques 130 and/or machine learning techniques 140, as well as one or more parameters related to detecting sensitive information. In one example, policy 122 specifies that a machine learning technique 140 is to be performed first and, if the machine learning technique 140 results in a likelihood above a given threshold that a given record contains sensitive information, then a particular search technique 130 is to be performed. Policy 122 may further specify that if the particular search technique 130 results in a likelihood above of a threshold that the given record contains sensitive information that the given record should be determined to contain sensitive information. In one embodiment, policy 122 further specifies that if the machine learning technique 140 results in a likelihood above a second threshold that no additional search techniques need to be performed, and that the record should be determined to include sensitive information. Results of applying policy 122 are output by sensitive information detector 120 as a sensitive information indicator 150, which generally indicates whether a given record 102 contains sensitive information.

It is noted that while some embodiments involve a single policy 122 for sensitive information generally, other embodiments involve separate policies 122 for different types of sensitive information. For example, one policy 122 may relate to detecting names, another policy 122 may relate to detecting dates of birth, another policy 122 may relate to detecting credit card numbers, another policy 122 may relate to detecting medical information, another policy may relate to identification numbers, like social security numbers, driver's license numbers, passport numbers, and the like.

Search techniques 130 include one or more pattern-based search techniques 132 and one or more term-based search techniques 134. Pattern-based search techniques 132 generally include search techniques that include regular expressions to which certain types of sensitive information are expected to conform. One example of a pattern-based search technique 132 is searching for the pattern **\*\*/\*\*/\*\*\*\***, where \* indicates any number from 0-9, when searching for a date of birth. While pattern-based search techniques 132 may be useful, they may be too rigid to catch certain instances of sensitive information (e.g., dates of birth represented in unusual ways, such as "the $10^{th}$ of August in the year 1979") while being over-inclusive in other ways (e.g., capturing dates that are not dates of birth). Thus, rather than or in addition to pattern-based search techniques 132, additional search techniques 130 and/or machine learning techniques 140 may be employed.

Term-based search techniques 134 involve searching for particular search terms, such as within a certain proximity of one another in a record. As described in more detail below with respect to FIG. 2, a term-based search technique 134 may involve searching for common last names within a certain proximity of common first names in a record, excluding names with a length below a threshold number of characters and exceptional names that have alternative meanings.

In another example, as described in more detail below with respect to FIG. 3, a term-based search technique 134 may involve searching for four-digit representations of years in a particular range likely to be associated with dates of birth (e.g., the 1970s) within a certain proximity of a day and a month (e.g., represented by text or by one or two digit numbers). A term-based search technique 134 may involve generating a confidence score indicating a likelihood of a given record containing sensitive information (or a particular type of sensitive information), such as based on how many instances (e.g., pairs of first and last names or full date matches) are detected in the given record. The confidence score may be normalized to produce a value between 0 and 1. In one example, the number of instances detected is divided by the number of instances detected plus one to produce a confidence score between 0 and 1.

Machine learning techniques 140 generally involve the use of one or more machine learning models 142. A given machine learning model 142 generally represents a machine learning model that has been trained based on a set of training data to produce outputs in response to input features. For instance, as described in more detail below with respect to FIG. 4, the training data may have included sets of features representing records associated with labels indicating whether the record contain sensitive information (or particular types of sensitive information).

There are many different types of machine learning models that can be used in embodiments of the present disclosure. For example, a machine learning model 142 may be a boosted tree model, a neural network, a support vector machine, a Bayesian belief network, a regression model, or a deep belief network, among others. A machine learning model 142 may also be an ensemble of several different individual machine learning models. Such an ensemble may be homogenous (i.e., using multiple member models of the same type, such as a random forest of decision trees) or non-homogenous (i.e., using multiple member models of different types). Individual machine learning models within such an ensemble may all be trained using the same subset of training data or may be trained using overlapping or non-overlapping subsets randomly selected from the training data.

In some embodiments, as describe below with respect to FIG. 4, training a machine learning model 142 is a supervised learning process that involves providing training inputs (e.g., sets of features) to the machine learning model 142 and iteratively adjusting parameters of the model based on comparing outputs from the model to labels associated with the training inputs in the training data.

Machine learning models 142 may include a single model for predicting sensitive information in general and/or specific models for predicting particular types of sensitive information. A given machine learning model 142, once trained, accepts inputs representing a given record (e.g., features of record 102) and outputs a confidence score indicating a likelihood that the given record contains sensitive information (or a particular type of sensitive information). Features of a given record provided as inputs to a machine learning model 142 may include, for example, characters in the record, segments of text in the record (e.g., tokens), and/or the like.

In one example, a plurality of tokens are determined by identifying all segments of text in record 102 that are separated by spaces or other delimiters. Certain contents of record 102 may be discarded when determining features. For example, common prefixes may be excluded from features. Furthermore, common structures such as internet protocol (IP) addresses, dates, numbers (e.g., values associated with operations), and the like, may be replaced with generic representations of the common structures such as one or one or more symbols or characters.

Thus, when provided with a record 102, sensitive information detector 120 applies policy 122 in order to determine whether record 102 contains sensitive information based on one or more search techniques 130 and/or machine learning techniques 140.

Policy 122 may include parameters such as thresholds related to detecting sensitive information. In some cases, there may be different paths to take within policy 122 based on outputs from intermediary stages. For example, policy 122 may specify that if a confidence score in a first range is output by a machine learning model 142, then a first search technique 130 is to be employed next (e.g., a rigid search technique 130, such as one that allows only a small distance between different search terms or pattern-based components). Similarly, policy 122 may specify that if a confidence score in a second range is output by the machine learning model 142, then a second search technique 130 is to be employed next (e.g., a less rigid search technique 130, such as one that allows a larger distance between different search terms or pattern-based components). In one particular example, policy 122 specifies that if a confidence score determined based on one or more of a machine learning technique or a term-based search technique is within a first range, a first (more rigid) pattern-based search technique is used, while if the confidence score is within a second range, a second (less rigid) pattern-based search technique is used (e.g., involving a more relaxed regular expression).

Sensitive information detector 120 outputs a sensitive information indicator 150, which indicates whether record 102 contains sensitive information (or one or more particular types of sensitive information). In some cases, sensitive information indicator 150 may include one or more confidence scores related to whether record 102 contains sensitive information, such as based on confidence scores output by one or more search techniques 130 and/or machine learning techniques 140 utilized during the application of policy 122.

Sensitive information indicator 150 allows action to be taken to address sensitive information that may be present in record 102. In some embodiments, sensitive information indicator 150 is provided to one or more components that perform additional operations, such as modifying records, modifying code, and/or displaying information to a user so that action can be manually taken. For example, the sensitive information may be removed or encrypted. In another example, code that produced record 102 may be identified and modified so that it does not include sensitive information in future records.

Example Name Search Techniques

Figure 2:
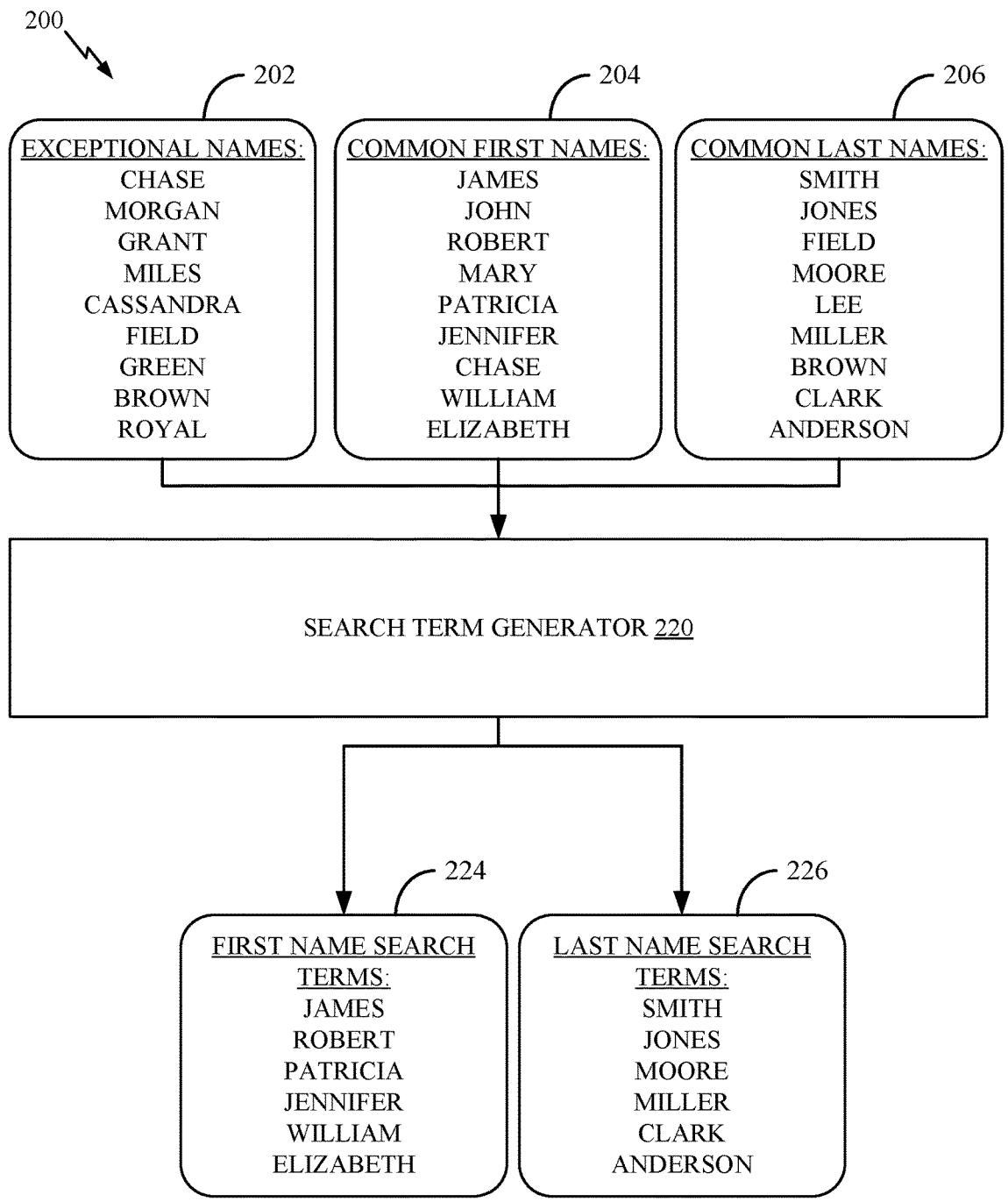
FIG. 2 depicts an example related to a search technique for detecting sensitive information in records.

FIG. 2 is an illustration 200 of an example related to a search technique for detecting sensitive information in records, such as one of the search techniques 130 in FIG. 1.

A list of common first names 204 is determined, such as based on publicly available information indicating common first names or given names, either globally or for one or more geographic regions. As a non-limiting example, common first names 204 include the names James, John, Robert, Mary, Patricia, Jennifer, Chase, William, and Elizabeth.

Similarly, a list of common last names 206 is determined, such as based on publicly available information indicating common last names or family names, either globally or for one or more geographic regions. As a non-limiting example, common last names 206 include the names Smith, Jones, Field, Moore, Lee, Miller, Brown, Clark, and Anderson. It is noted that, in practice, common first names 204 and common last names 206 would likely include substantially more names than those shown.

Also, a list of exceptional names 202 is determined, such as based on user input or publicly available information indicating names that have secondary meanings such that their appearance in a record may not indicate sensitive information. As a non-limiting example, exceptional names 202 include the names Chase (which may refer to the bank Chase® rather than a person's name), Morgan (which may refer to the bank J. P. Morgan® rather than a person's name), Grant (which may refer to a grant of funds rather than a person's name), Miles (which may refer to mileage rather than a person's name), Cassandra (which may refer to a particular database rather than a person's name), Field (which may refer to a field in a form rather than a person's name), Green (which may refer to the color rather than a person's name), Brown (which may refer to the color rather than a person's name), and Royal (which may refer to the adjective rather than a person's name).

A search term generator 220 generates first name search terms 224 and last name search terms 226 based on exceptional names 202, common first names 204, and common last names 206, such as by excluding names that are exceptional or meet one or more other conditions, such as being shorter than a given number of characters. In illustration 200, search term generator 220 removes names shorter than 5 characters and names included in exceptional names 202 from common first names 204 and common last names 206. Thus, search term generator 220 excludes the names John, Mary and Lee for being shorter than 5 characters and excludes the names Chase, Field, and Brown for being included in exceptional names 202. Accordingly, the first name search terms 224 generated by search term generator 220 include James, Robert, Patricia, Jennifer, William, and Elizabeth and the last name search terms 226 generated by search term generator 220 include Smith, Jones, Moore, Miller, Clark, and Anderson.

According to one example, a search technique for identifying names in records including searching for first name search terms 224 and, if a first name is found, searching for last name search terms 226 within a given proximity (e.g., within a certain number of characters or tokens) of the first name.

In some embodiments a series of tokens is determined from a record prior to searching, and the search is performed on the series of tokens, with a match occurring when a token (e.g., individual word or number) matches a search term. For each full name (e.g., pair of first name and last name within a given proximity of one another) that is located in a given record, a name counter is incremented by one. In order to produce a confidence score indicating a likelihood that the given record contains a name, the total number of names detected (e.g., the final value of the name counter) is divided by itself plus one. For example, if 1 full name is detected, then the confidence score would be 1/(1+1)=0.5. In another example, 3 full names are detected, then the confidence score would be 3/(3+1)=0.75. Thus, the higher the number of names detected, the closer the confidence score will be to 1, while never actually reaching 1. Other techniques may alternatively be utilized to determine confidence scores.

Example Date of Birth Search Techniques

Figure 3:
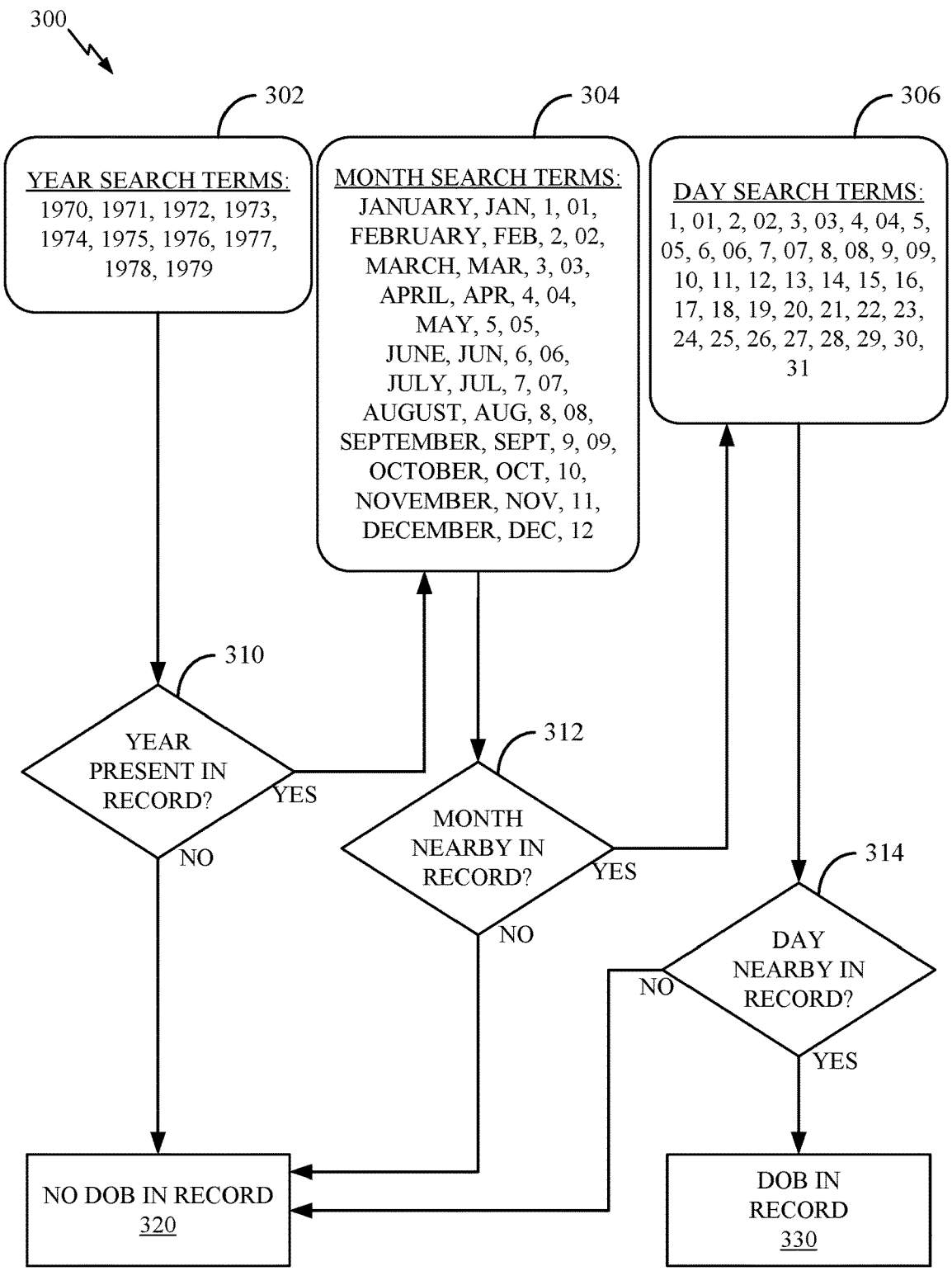
FIG. 3 depicts another example related to a search technique for detecting sensitive information in records.

FIG. 3 is an illustration 300 of another example related to a search technique for detecting sensitive information in records, such as one of the search techniques 130 in FIG. 1.

A list of year search terms 302 includes four digit representations of years in a certain range having a high probability of being associated with dates of birth. As a non-limiting example, year search terms 302 include 1970, 1971, 1972, 1973, 1974, 1975, 1976, 1977, 1978, and 1979. While there are many dates of birth associated with years outside of the 1970s, limiting year search terms 302 to years in the 1970s reduced false positives by avoiding matches that are not associated with dates of birth (e.g., associated with other events that are not dates of birth).

A list of month search terms 304 includes common textual and numerical representations of months. As a non-limiting example, month search terms 304 include January, Jan., 1, 01, February, Feb., 2, 02, March, Mar., 3, 03, April, Apr., 4, 04, May, 5, 05, June, Jun., 6, 06, July, Jul., 7, 07, August, Aug., 8, 08, September, Sept., 9, 09, October, Oct., 10, November, Nov., 11, December, Dec., and 12.

A list of day search terms include common representations of days of months. As a non-limiting example, day search terms 306 include 1, 01, 2, 02, 3, 03, 4, 04, 5, 05, 6, 06, 7, 07, 8, 08, 9, 09, 10, 11, 12, 13, 14, 15, 16, 17, 18, 19, 20, 21, 22, 23, 24, 25, 26, 27, 28, 29, 30, and 31.

An example search technique for dates of birth in a record begins at step 310 with a determination of whether a year from year search terms 302 is included in a record, such as a record. If a year from year search terms 302 is not included in the record, then operations conclude at step 320 with a determination that there is no date of birth in the record. If a year from year search terms 302 is included in the record, then operations continue to step 312 with a determination of whether a month from month search terms 304 is included in the record within a certain proximity of the detected year.

If a month from month search terms 304 is not included in the record within a certain proximity of the detected year, then operations conclude at step 320 with a determination that there is no date of birth in the record. If a month from month search terms 304 is included in the record within a certain proximity of the detected year, then operations continue to step 314 with a determination of whether a day from day search terms 306 is included in the record within a certain proximity of the detected year and/or month.

If a day from day search terms 306 is not included in the record within a certain proximity of the detected year and/or month, then operations conclude at step 320 with a determination that there is no date of birth in the record. If a day from day search terms 306 is included in the record within a certain proximity of the detected year and/or month, then operations conclude at step 330 with a determination that there is a date of birth in the record.

In some embodiments a series of tokens is determined from a record prior to searching for dates of birth, and the search is performed on the series of tokens, with a match occurring when a token matches a search term. For example, the series of tokens may include all individual words or segments of text that are separated by a space and/or other delimiter, and a match may occur when an entire token matches a search term.

Illustration 300 depicts one example search technique for detecting dates of birth, and many variations are possible. For example, an alternative search technique could search for months or days first rather than years.

Similar search techniques to those described above for names and dates of birth may also be utilized to search for other types of sensitive information, such as bank account numbers (e.g., based on searching for common routing numbers), credit card numbers (e.g., based on searching for common components of credit card numbers, such as four-digit combinations common to many credit card numbers), social security numbers (e.g., based on searching for common groups of numbers shared by many social security numbers), physical addresses (e.g., based on searching for common street names), medical information (e.g., based on searching for common medical terms related to sensitive medical information), email addresses (e.g., based on searching for common email domain names), and the like.

Searching for specific search terms in a record is efficient, resulting in high performance numbers. For example, term-based search techniques are generally faster and require less processing resources than existing pattern-based search techniques.

Example Machine Learning Techniques

Figure 4:
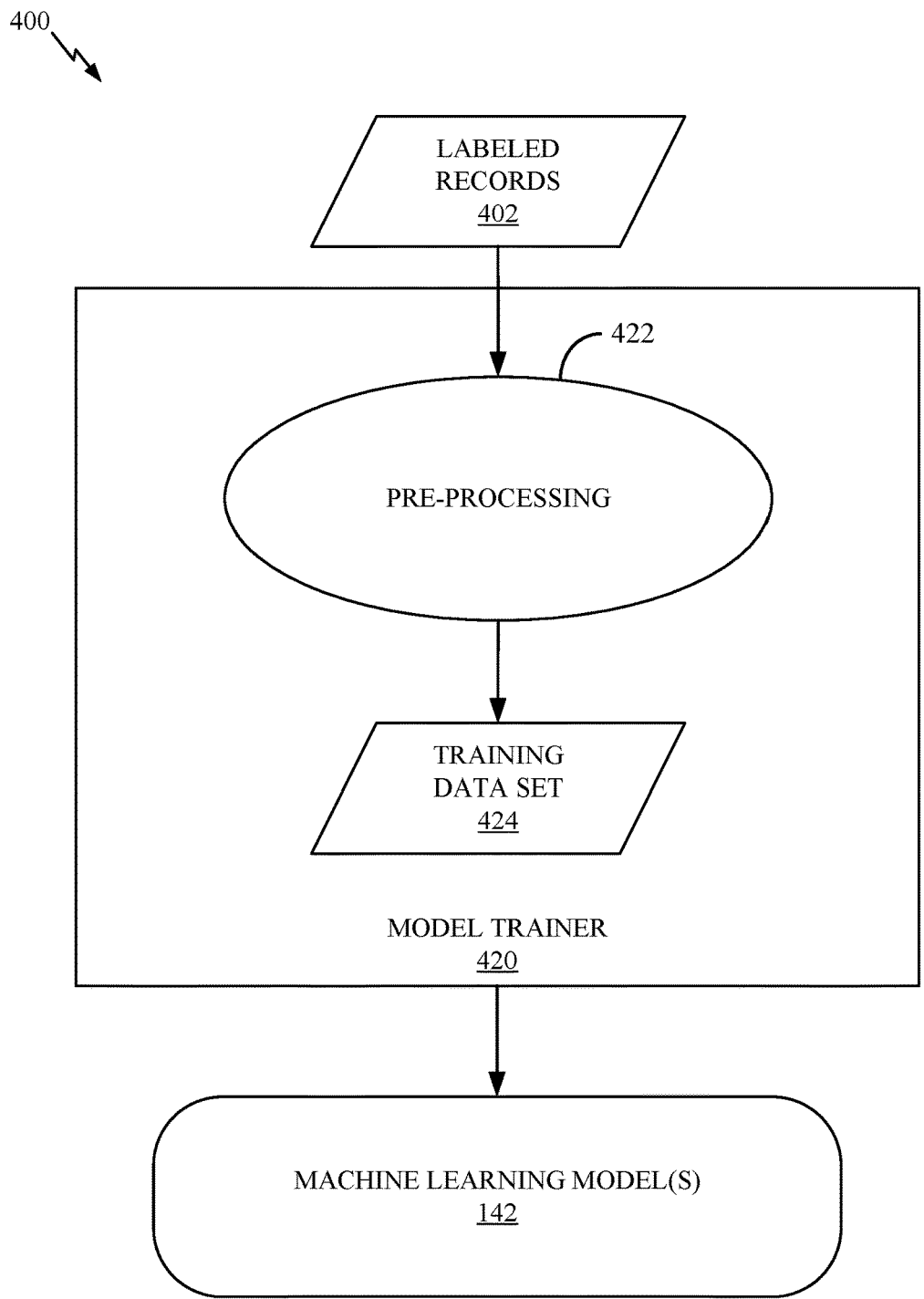
FIG. 4 depicts an example related to a machine learning technique for detecting sensitive information in records.

FIG. 4 is an illustration 400 of training a machine learning model for predicting sensitive information in records. Illustration 400 includes one or more machine learning models 142 of FIG. 1.

A set of labeled record 402 includes records, such as records, associated with labels indicating whether the records include sensitive information (or, in some embodiments, specific types of sensitive information). For example, the labels may be based on input from one or more users indicating whether each record contains sensitive information or a specific type of sensitive information. In another example, the labels may be based on previous determinations from one or more detection techniques described herein (e.g., in instances where confidence values of determinations are above a threshold). Labeled records 402 are used in a supervised learning process to train the one or more machine learning models 142.

Model trainer 420 performs operations related to training the one or more machine learning models 142. Pre-processing 422 is performed on labeled records 402 in order to generate a training data set 424. Pre-processing 422 may include, for example, removing common prefixes that frequently appear in records. Pre-processing 422 may further include replacing common structures with generic representations, such as symbols representing particular types of structures (e.g., network addresses, usernames, application identifiers, or the like). Furthermore, pre-processing 422 may include generating features of the records, such as by extracting characters and/or tokens from the records.

Training data set 424 includes features of records associated with labels indicating whether the records contain sensitive information or particular types of sensitive information. Model trainer 420 utilizes training data set 424 in order to train a machine learning model 142, such as by providing the features of record in training data set 424 as training inputs to the machine learning model 142.

The machine learning model 142 processes the training inputs and outputs predictions (e.g., indicating a likelihood that sensitive information or a particular type of sensitive information is present) with respect to particular records represented by the features. The outputs are compared to the labels associated with the training inputs to determine the accuracy of the machine learning model 142, and machine learning model 142 is iteratively adjusted until one or more conditions are met, which may involve optimizing an objective function. In some embodiments, validation and testing are also performed for the machine learning model 142, such as based on validation data and test data, as is known in the art. The machine learning model 142 may be trained through batch training (e.g., each time a threshold number of training data instances have been generated, an amount of time has elapsed, or some other condition is met) and/or through online training (e.g., re-training the machine learning model 142 with each new training data instance as it is generated).

Once trained, each of the one or more machine learning models 142 may be used to detect sensitive information in records. For example, features of a record may be provided as inputs to a trained model, and the model may output a confidence score indicating a likelihood that the record contains sensitive information or a particular type of sensitive information. In some embodiments, the model may be re-trained based on ground truth labels. For example, if a user provides a ground truth label indicating that a given record does or does not contain sensitive information, the ground truth label may be associated with features of the given record and used as a new training data instance to re-train the model for improved accuracy.

Dynamic Policy Modification

Figure 5:
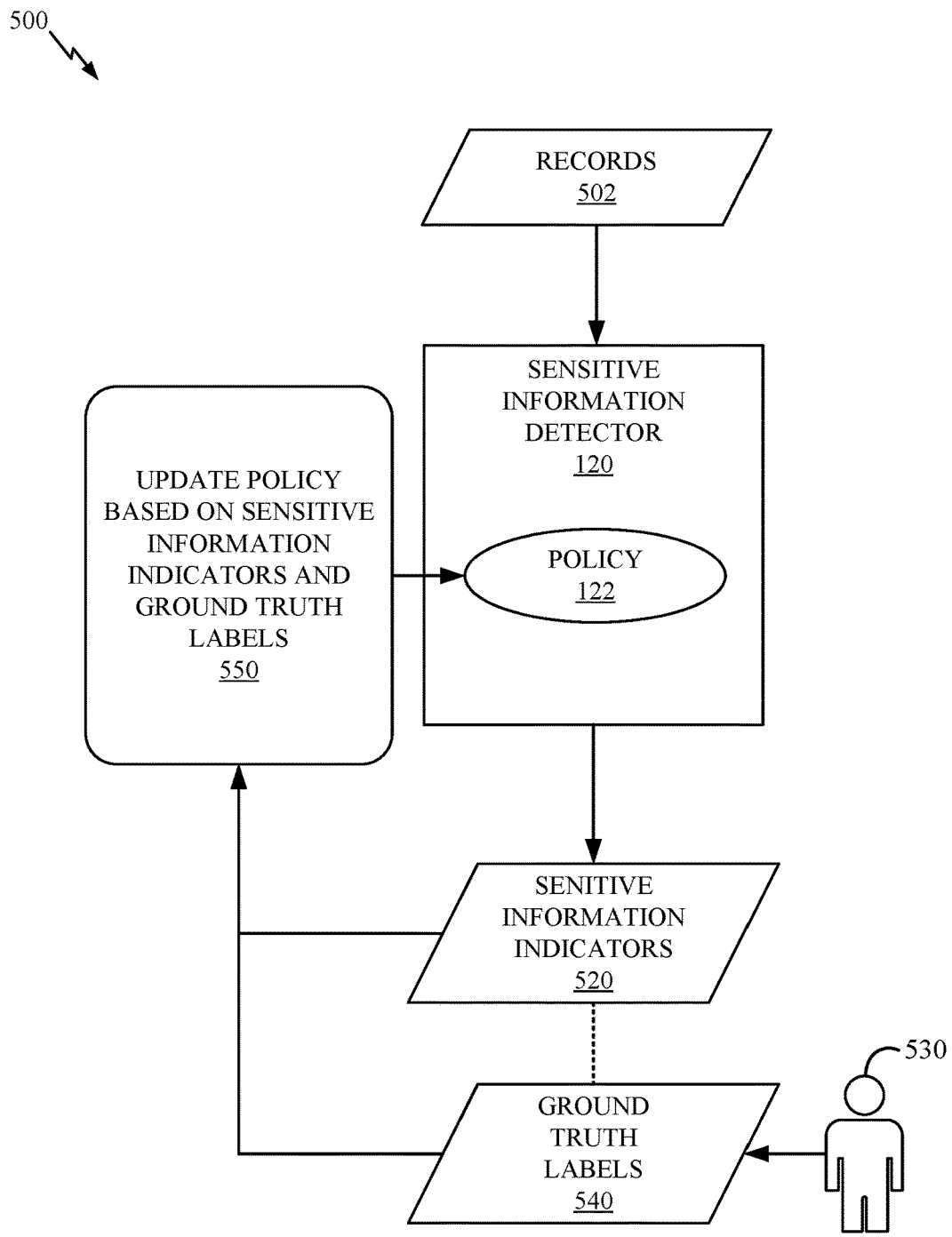
FIG. 5 depicts an example of updating a policy for detecting sensitive information in records.

FIG. 5 is an illustration 500 of an example of updating a policy for detecting sensitive information in records. Illustration 500 includes sensitive information detector 120 and policy 122 of FIG. 1. Illustration 500 depicts a process by which policy 122 is dynamically updated.

One or more records 502 are processed by sensitive information detector 120 according to policy 122 to determine sensitive information indicators 520 as described above with respect to FIG. 1. For example, sensitive information indicators 520 may indicate whether records 502 contain sensitive information in general or particular types of sensitive information as a result of one or more detection techniques. In some embodiments, sensitive information indicators 520 comprise confidence scores (e.g., the confidence scores produced by each of the detection techniques used and/or aggregated confidence scores from all detection techniques used).

A user 530 provides ground truth labels 540 with respect to records 502 indicating whether records 502 actually contain sensitive information in general or particular types of sensitive information. For instance, user 530 may review records 502 and provide input via a user interface.

At step 550, policy 122 is updated based on sensitive information indicators 520 and ground truth labels 540. In one example, policy 122 is updated to favor detection techniques that produced results more closely matching the ground truth labels. For example, if a particular search technique consistently produces results that more closely match the ground truth labels, then policy 122 may be updated to perform the particular search technique first and to only perform additional detection techniques if the particular search technique produces a confidence score above a threshold. As another example, if the ground truth labels indicate that a particular machine learning model is substantially more accurate when it outputs a confidence score above a given threshold, then policy 122 may be updated such that a record is not determined to contain sensitive information unless the particular machine learning model outputs a confidence score above the given threshold for the record.

Thus, policy 122 may be dynamically adjusted over time for improved accuracy, thereby reducing false positives and improving efforts to identify and address sensitive information in records.

It is noted that the example policies described herein are not limiting, and other policies may be used. For example, a policy may involve only one detection technique. In another example, a policy may specify that a first detection technique must have a confidence score above a first threshold and a second detection technique must have a confidence score above a second threshold in order to determine that a record contains sensitive information. Policies may involve more than two detection techniques. For instance, a policy may specify that a plurality of detection techniques are to be performed, and a record is determined to contain sensitive information if at least a certain number of the detection techniques produce a confidence score above a threshold, such as if any two detection techniques produce a confidence score above 0.75. In one example, a policy specifies that if any one detection technique produces a confidence score above a particular threshold (e.g., 0.9) that the record is determined to contain sensitive information regardless of the results of any other detection techniques. As described above, the detection techniques and/or parameters may be dynamically selected and/or modified based on ground truth labels, such as to favor detection techniques and/or parameters that produce results most consistent with the ground truth labels.

Example Operations for Detecting Sensitive Information in Records

Figure 6:
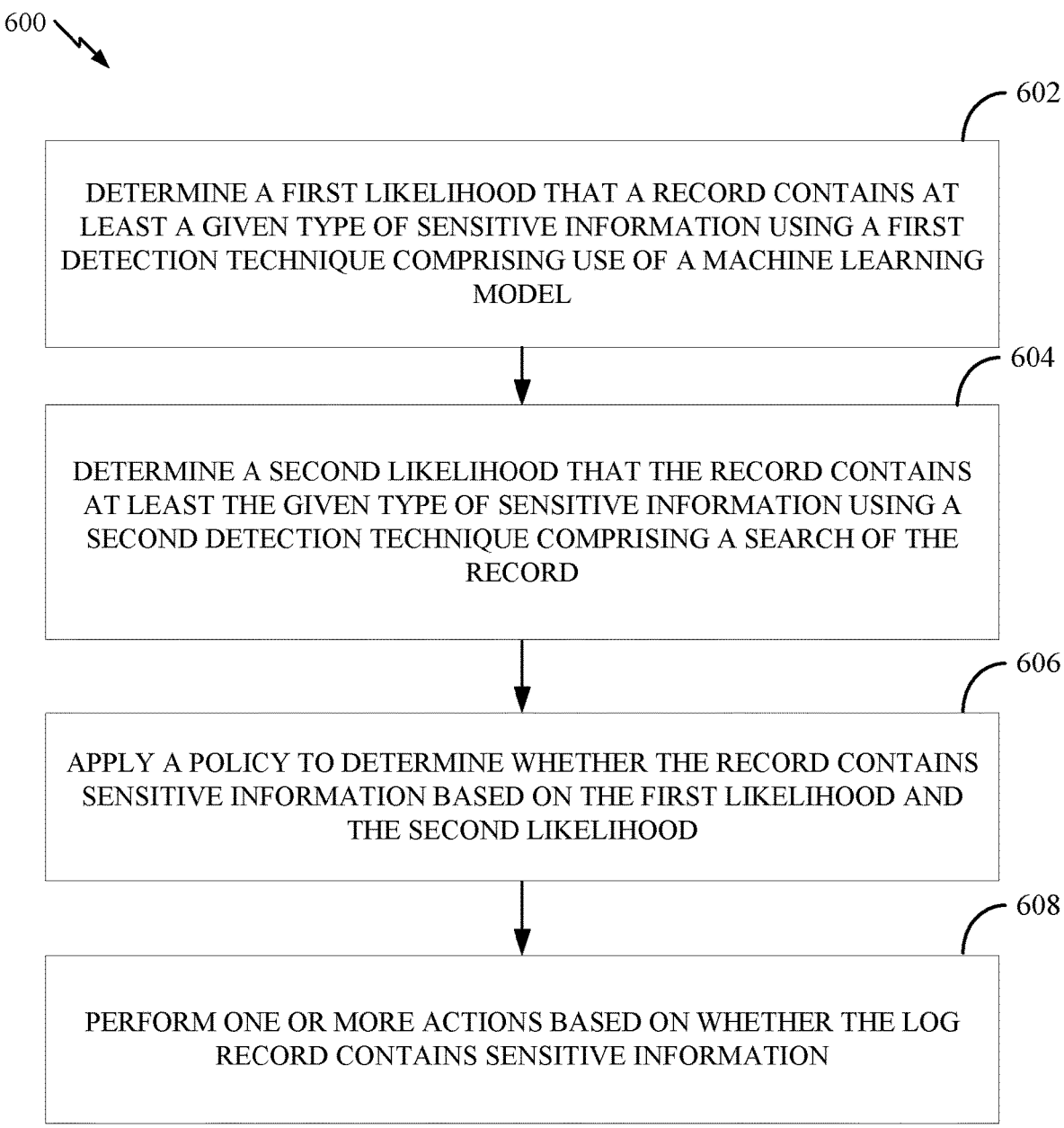
FIG. 6 depicts example operations for detecting sensitive information in records.

FIG. 6 depicts example operations 600 for detecting sensitive information in records. For example, operations 600 may be performed by sensitive information detector 120 of FIGS. 1 and 5.

Operations 600 begin at step 602 with determining a first likelihood that a record contains at least a given type of sensitive information using a first detection technique comprising use of a machine learning model. The first detection technique may involve providing one or more inputs to a machine learning model based on the record and receiving the first likelihood as an output from the machine learning model based on the one or more inputs. The one or more inputs may comprise, for example, tokens determined from the record and/or characters from the record. In one embodiment, the second detection technique is selected from a plurality of detection techniques based on the first likelihood.

Operations 600 continue at step 604 with determining a second likelihood that the record contains at least the given type of sensitive information using a second detection technique comprising a search of the record. The search of the record may be based on one or more search terms. In some embodiments, the search of the record comprises converting text in the record into a plurality of tokens, searching the plurality of tokens for a first set of search terms, detecting a first term from the first set of search terms in the plurality of tokens, and searching the plurality of tokens for a second set of search terms within a given proximity of the first token.

In some embodiments, the first set of search terms may be generated by excluding, from a list of first names, one or more exceptional first names and one or more first names longer than a given number of characters, such as described above with respect to FIG. 2. Similarly, the second set of search terms may be generated by excluding, from a list of last names, one or more exceptional last names and one or more last names longer than the given number of characters, such as described above with respect to FIG. 2. In one example, the first set of search terms comprises years in a given range and the second set of search terms comprises months, such as described above with respect to FIG. 3.

Operations 600 continue at step 606 with applying a policy to determine whether the record contains sensitive information based on the first likelihood and the second likelihood. The policy may indicate the first detection technique and the second detection technique along with one or more parameters related to detecting sensitive information, such as thresholds, ranges, input features, order of performing detection techniques, number of detection techniques used, number of detection techniques that must produce a confidence score above a threshold, and/or the like.

Operations 600 continue at step 608 with performing one or more actions based on whether the record contains sensitive information. The one or more actions may include, for example, removing one or more sensitive information items from the record, encrypting one or more sensitive information items in the record, generating a notification indicating whether the record contains sensitive information, modifying code relating to generation of the record, or other types of operations related to addressing sensitive information in records.

Certain embodiments further include receiving a ground truth label indicating whether the record contains sensitive information and revising the policy based on the ground truth label.

Notably, method 600 is just one example with a selection of example steps, but additional methods with more, fewer, and/or different steps are possible based on the disclosure herein.

Figure 7:
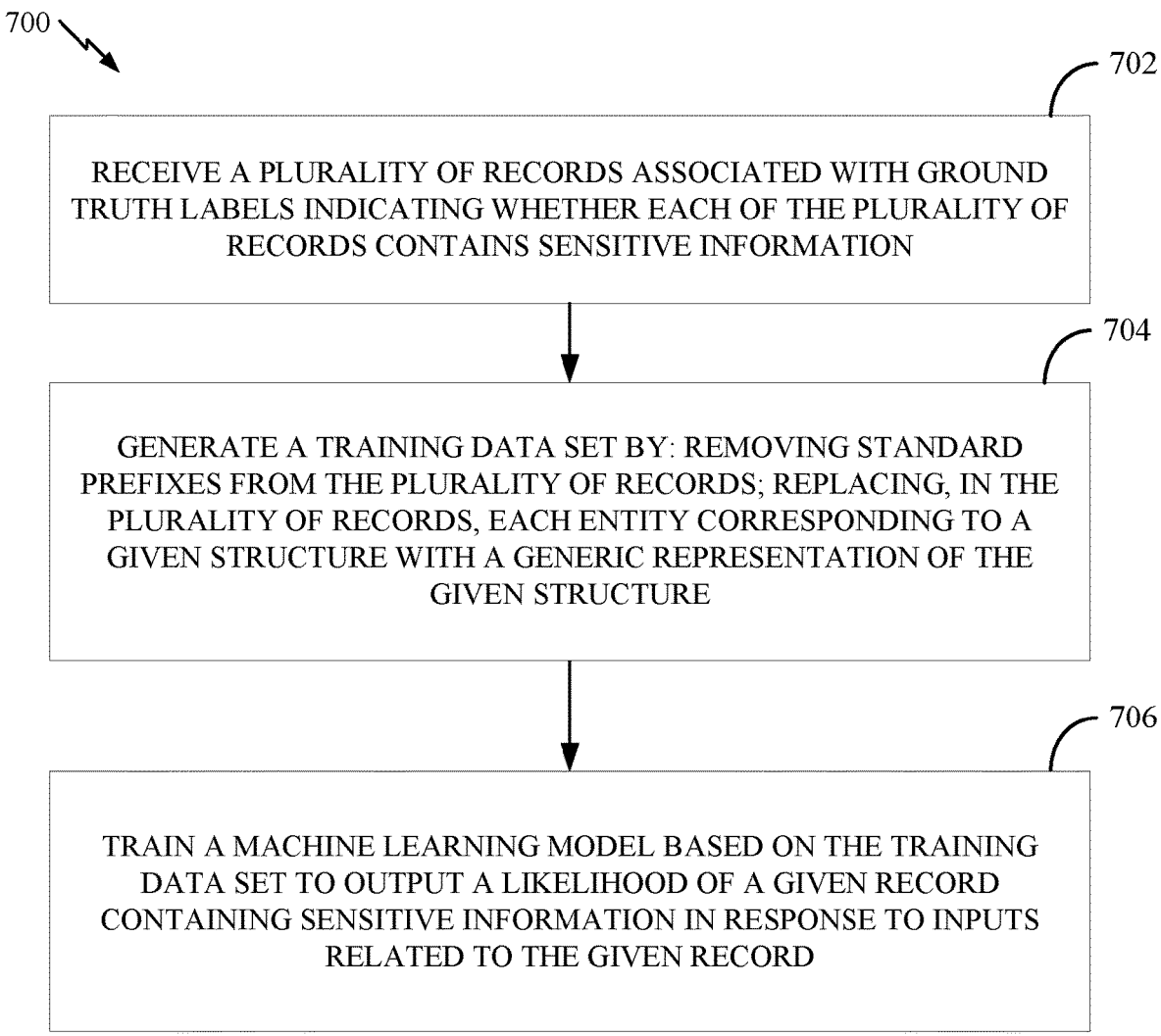
FIG. 7 depicts example operations for training a sensitive information prediction machine learning model.

Example Operations for Training a Sensitive Information Prediction Machine Learning Model FIG. 7 depicts example operations 700 for training a sensitive information prediction machine learning model. For example, operations 700 may be performed by model trainer 420 of FIG. 4.

Operations 700 begin at step 702 with receiving a plurality of records associated with ground truth labels indicating whether each of the plurality of records contains sensitive information.

Operations 700 continue at step 704 with generating a training data set by removing standard prefixes from the plurality of records and replacing, in the plurality of records, each entity corresponding to a given structure with a generic representation of the given structure. Replacing each entity corresponding to the given structure with the generic representation of the given structure may comprise, for example, replacing IP addresses with generic IP address representations, replacing dates with generic date representations, or replacing numbers with generic number representations. Generating the training data set may further comprise, after removing the standard prefixes from the plurality of records and replacing each entity corresponding to the given structure with the generic representation of the given structure, extracting features from the plurality of records and associating the features with the ground truth labels.

Operations 700 continue at step 706 with training a machine learning model based on the training data set to output a likelihood of a given record containing sensitive information in response to inputs related to the given record.

Training the machine learning model may comprise, for example, providing the features as inputs to the machine learning model, receiving outputs from the machine learning model based on the inputs, and iteratively adjusting parameters of the machine learning model based on comparing the outputs to the ground truth labels.

Certain embodiments further include receiving user input indicating an accuracy of one or more outputs from the machine learning model and re-training the machine learning model based on the user input.

Notably, method 700 is just one example with a selection of example steps, but additional methods with more, fewer, and/or different steps are possible based on the disclosure herein.

Example Computing System

Figure 8:
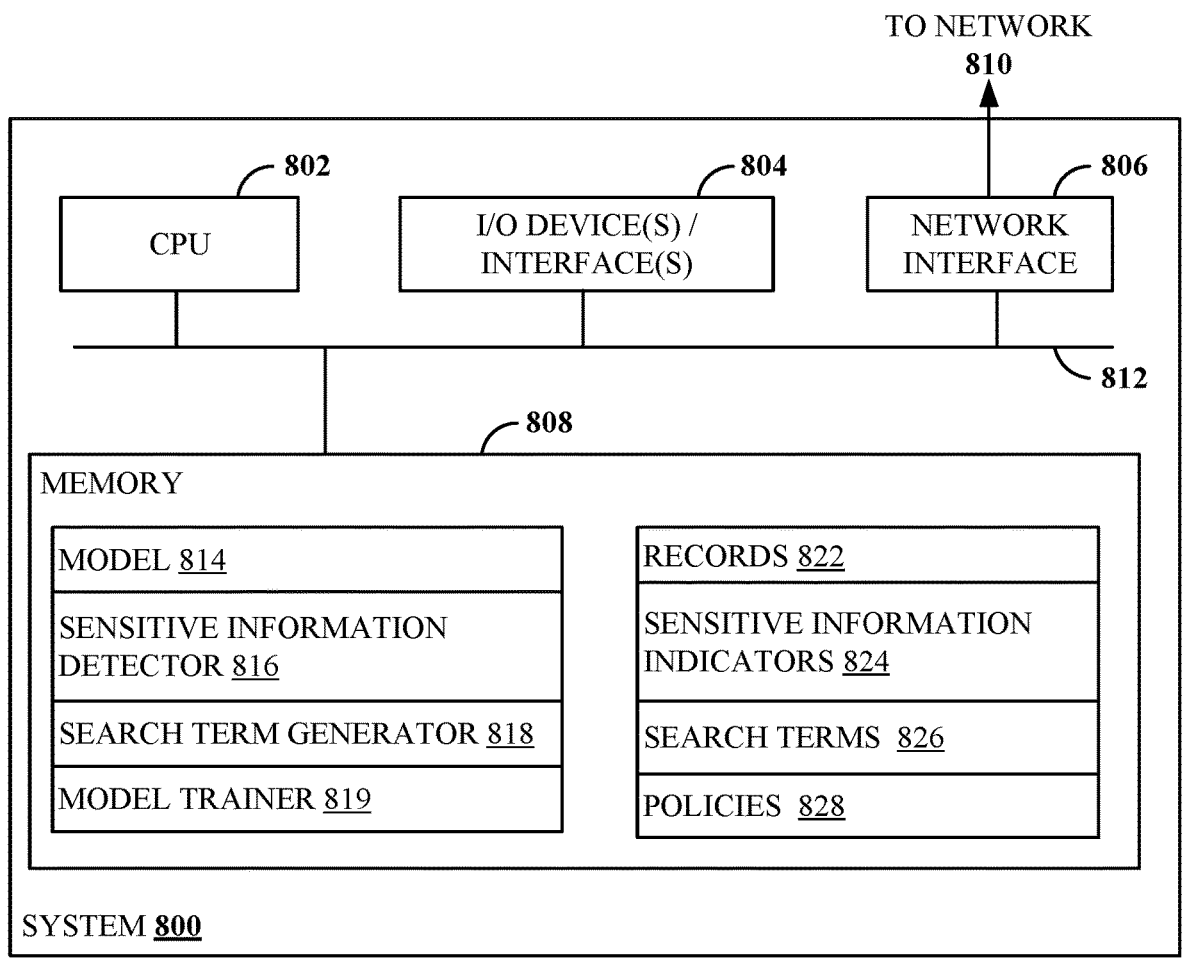
FIG. 8 depicts an example processing system for detecting sensitive information in records.

FIG. 8 illustrates an example system 800 with which embodiments of the present disclosure may be implemented. For example, system 800 may be configured to perform operations 600 of FIG. 6 and/or operations 700 of FIG. 7.

System 800 includes a central processing unit (CPU) 802, one or more I/O device interfaces 804 that may allow for the connection of various I/O devices 814 (e.g., keyboards, displays, mouse devices, pen input, etc.) to the system 800, network interface 806, a memory 808, and an interconnect 812. It is contemplated that one or more components of system 800 may be located remotely and accessed via a network 810. It is further contemplated that one or more components of system 800 may comprise physical components or virtualized components.

CPU 802 may retrieve and execute programming instructions stored in the memory 808. Similarly, the CPU 802 may retrieve and store application data residing in the memory 808. The interconnect 812 transmits programming instructions and application data, among the CPU 802, I/O device interface 804, network interface 806, and memory 808. CPU 802 is included to be representative of a single CPU, multiple CPUs, a single CPU having multiple processing cores, and other arrangements.

Additionally, the memory 808 is included to be representative of a random access memory or the like. In some embodiments, memory 808 may comprise a disk drive, solid state drive, or a collection of storage devices distributed across multiple storage systems. Although shown as a single unit, the memory 808 may be a combination of fixed and/or removable storage devices, such as fixed disc drives, removable memory cards or optical storage, network attached storage (NAS), or a storage area-network (SAN).

As shown, memory 808 includes model 814, sensitive information detector 816, search term generator 818, and model trainer 819, which may be representative of one or more of machine learning models 142 of FIG. 1, sensitive information detector 120 of FIG. 1, search term generator 220 of FIG. 2, and model trainer 420 of FIG. 4.

Memory 808 further comprises records 822, sensitive information indicators 824, search terms 826, and policies 828, which may be representative of record 102 of FIG. 1 and records 502 of FIG. 5, sensitive information indicator 150 of FIG. 1 and sensitive information indicators 520 of FIG. 5, first name search terms 224 and last name search terms 226 of FIG. 2 and year search terms 302, month search terms 304, and day search terms 306 of FIG. 3, and policy 122 of FIG. 1.

Example Clauses

Clause 1: A method for detecting sensitive information, comprising: determining a first likelihood that a record contains at least a given type of sensitive information using a first detection technique comprising: providing one or more inputs to a machine learning model based on the record; and receiving the first likelihood as an output from the machine learning model based on the one or more inputs; determining a second likelihood that the record contains at least the given type of sensitive information using a second detection technique comprising a search of the record; applying a policy to determine whether the record contains sensitive information based on the first likelihood and the second likelihood; and performing one or more actions based on whether the record contains sensitive information.

Clause 2: The method of Clause 1, wherein the search of the record comprises: converting text in the record into a plurality of tokens; searching the plurality of tokens for a first set of search terms; detecting a first term from the first set of search terms in the plurality of tokens; and searching the plurality of tokens for a second set of search terms within a given proximity of the first term.

Clause 3: The method of Clause 2, further comprising: generating the first set of search terms by excluding, from a list of first names, one or more exceptional first names and one or more first names longer than a given number of characters; and generating the second set of search terms by excluding, from a list of last names, one or more exceptional last names and one or more last names longer than the given number of characters.

Clause 4: The method of any one of Clause 2-3, wherein: the first set of search terms comprises years in a given range; and the second set of search terms comprises months.

Clause 5: The method of any one of Clause 1-4, further comprising: receiving a ground truth label indicating whether the record contains sensitive information; and revising the policy based on the ground truth label.

Clause 6: The method of any one of Clause 1-5, further comprising selecting the second detection technique from a plurality of detection techniques based on the first likelihood.

Clause 7: The method of any one of Clause 1-6, wherein providing the one or more inputs to the machine learning model based on the record comprises providing, as the one or more inputs to the machine learning model, one or more of: tokens determined from the record; or characters from the record.

Clause 8: The method of any one of Clause 1-7, wherein performing the one or more actions based on whether the record contains sensitive information comprises one or more of: removing one or more sensitive information items from the record; encrypting one or more sensitive information items in the record; generating a notification indicating whether the record contains sensitive information; or modifying code relating to generation of the record.

Clause 9: A method of training a sensitive information prediction machine learning model, comprising: receiving a plurality of records associated with ground truth labels indicating whether each of the plurality of records contains sensitive information; generating a training data set by: removing standard prefixes from the plurality of records; and replacing, in the plurality of records, each entity corresponding to a given structure with a generic representation of the given structure; and training a machine learning model based on the training data set to output a likelihood of a given record containing sensitive information in response to inputs related to the given record.

Clause 10: The method of Clause 9, wherein replacing, in the plurality of records, each entity corresponding to the given structure with the generic representation of the given structure comprises one or more of: replacing IP addresses with generic IP address representations; replacing dates with generic date representations; or replacing numbers with generic number representations.

Clause 11: The method of any one of Clause 9-10, wherein generating the training data set further comprises, after removing the standard prefixes from the plurality of records and replacing, in the plurality of records, each entity corresponding to the given structure with the generic representation of the given structure, extracting features from the plurality of records.

Clause 12: The method of Clause 11, wherein training the machine learning model comprises: providing the features as inputs to the machine learning model; receiving outputs from the machine learning model based on the inputs; and iteratively adjusting parameters of the machine learning model based on comparing the outputs to the ground truth labels.

Clause 13: The method of any one of Clause 9-12, further comprising: receiving user input indicating an accuracy of one or more outputs from the machine learning model; and re-training the machine learning model based on the user input.

Clause 14: A system for detecting sensitive information, comprising: one or more processors; and a memory comprising instructions that, when executed by the one or more processors, cause the system to: determine a first likelihood that a record contains at least a given type of sensitive information using a first detection technique comprising: providing one or more inputs to a machine learning model based on the record; and receiving the first likelihood as an output from the machine learning model based on the one or more inputs; determine a second likelihood that the record contains at least the given type of sensitive information using a second detection technique comprising a search of the record; apply a policy to determine whether the record contains sensitive information based on the first likelihood and the second likelihood; and perform one or more actions based on whether the record contains sensitive information.

Clause 15: The system of Clause 14, wherein the search of the record comprises: converting text in the record into a plurality of tokens; searching the plurality of tokens for a first set of search terms; detecting a first term from the first set of search terms in the plurality of tokens; and searching the plurality of tokens for a second set of search terms within a given proximity of the first term.

Clause 16: The system of Clause 15, wherein the instructions, when executed by the one or more processors, further cause the system to: generate the first set of search terms by excluding, from a list of first names, one or more exceptional first names and one or more first names longer than a given number of characters; and generate the second set of search terms by excluding, from a list of last names, one or more exceptional last names and one or more last names longer than the given number of characters.

Clause 17: The system of any one of Clause 15-16, wherein: the first set of search terms comprises years in a given range; and the second set of search terms comprises months.

Clause 18: The system of any one of Clause 14-17, wherein the instructions, when executed by the one or more processors, further cause the system to: receive a ground truth label indicating whether the record contains sensitive information; and revise the policy based on the ground truth label.

Clause 19: The system of any one of Clause 14-18, wherein the instructions, when executed by the one or more processors, further cause the system to select the second detection technique from a plurality of detection techniques based on the first likelihood.

Clause 20: The system of any one of Clause 14-19, wherein providing the one or more inputs to the machine learning model based on the record comprises providing, as the one or more inputs to the machine learning model, one or more of: tokens determined from the record; or characters from the record.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory)

and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for detecting sensitive information, comprising:

determining a first likelihood that a record contains at least a given type of sensitive information using a first detection technique comprising:
  providing one or more inputs to a machine learning model based on the record; and
  receiving the first likelihood as an output from the machine learning model based on the one or more inputs;
determining a second likelihood that the record contains at least the given type of sensitive information using a second detection technique comprising a search of the record;
applying a policy to determine whether the record contains sensitive information based on the first likelihood and the second likelihood, wherein the policy states that the second detection technique is used when the first likelihood determined using the first detection technique is above a threshold likelihood;
performing one or more actions based on whether the record contains sensitive information;
receiving a ground truth label indicating whether the record contains sensitive information; and
revising the policy based on the ground truth label.

2. The method of claim 1, wherein the search of the record comprises:
  converting text in the record into a plurality of tokens;
  searching the plurality of tokens for a first set of search terms;
  detecting a first term from the first set of search terms in the plurality of tokens; and
  searching the plurality of tokens for a second set of search terms within a given proximity of the first term.

3. The method of claim 2, further comprising:
  generating the first set of search terms by excluding, from a list of first names, one or more exceptional first names and one or more first names longer than a given number of characters; and
  generating the second set of search terms by excluding, from a list of last names, one or more exceptional last names and one or more last names longer than the given number of characters.

4. The method of claim 2, wherein:
  the first set of search terms comprises years in a given range; and
  the second set of search terms comprises months.

5. The method of claim 1, further comprising selecting the second detection technique from a plurality of detection techniques based on the first likelihood.

6. The method of claim 1, wherein providing the one or more inputs to the machine learning model based on the record comprises providing, as the one or more inputs to the machine learning model, one or more of:
  tokens determined from the record; or
  characters from the record.

7. The method of claim 1, wherein performing the one or more actions based on whether the record contains sensitive information comprises one or more of:
  removing one or more sensitive information items from the record;
  encrypting one or more sensitive information items in the record;
  generating a notification indicating whether the record contains sensitive information; or
  modifying code relating to generation of the record.

8. A system for detecting sensitive information, comprising:
  one or more processors; and
  a memory comprising instructions that, when executed by the one or more processors, cause the system to:
    determine a first likelihood that a record contains at least a given type of sensitive information using a first detection technique comprising:
      providing one or more inputs to a machine learning model based on the record; and
      receiving the first likelihood as an output from the machine learning model based on the one or more inputs;
    determine a second likelihood that the record contains at least the given type of sensitive information using a second detection technique comprising a search of the record;
    apply a policy to determine whether the record contains sensitive information based on the first likelihood and the second likelihood, wherein the policy states that the second detection technique is used when the first likelihood determined using the first detection technique is above a threshold likelihood;
    perform one or more actions based on whether the record contains sensitive information;
    receive a ground truth label indicating whether the record contains sensitive information; and
    revise the policy based on the ground truth label.

9. The system of claim 8, wherein the search of the record comprises:
  converting text in the record into a plurality of tokens;
  searching the plurality of tokens for a first set of search terms;
  detecting a first term from the first set of search terms in the plurality of tokens; and
  searching the plurality of tokens for a second set of search terms within a given proximity of the first term.

10. The system of claim 9, wherein the instructions, when executed by the one or more processors, further cause the system to:
  generate the first set of search terms by excluding, from a list of first names, one or more exceptional first names and one or more first names longer than a given number of characters; and
  generate the second set of search terms by excluding, from a list of last names, one or more exceptional last names and one or more last names longer than the given number of characters.

11. The system of claim 9, wherein:
  the first set of search terms comprises years in a given range; and
  the second set of search terms comprises months.

12. The system of claim 8, wherein the instructions, when executed by the one or more processors, further cause the system to select the second detection technique from a plurality of detection techniques based on the first likelihood.

13. The system of claim 8, wherein providing the one or more inputs to the machine learning model based on the record comprises providing, as the one or more inputs to the machine learning model, one or more of:
  tokens determined from the record; or
  characters from the record.

14. The method of claim 1, wherein revising the policy based on the ground truth label comprises adjusting the threshold likelihood.

15. The method of claim 1, wherein revising the policy based on the ground truth label comprises adjusting an order of performing the first detection technique and the second detection technique from a first order in which the second detection technique is used based on the first likelihood being above the threshold likelihood to a second order in which the first detection technique is used based on the second likelihood being above the threshold likelihood.

\* \* \* \* \*